(12) United States Patent
Cronk

(10) Patent No.: US 6,327,142 B1
(45) Date of Patent: *Dec. 4, 2001

(54) PORTABLE COMPUTING DEVICE WITH LEATHER GRAIN TOP

(76) Inventor: Peter J. Cronk, 919 McElwee Rd., Moorestown, NJ (US) 08057

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,678

(22) Filed: Jul. 26, 1999

Related U.S. Application Data

(63) Continuation-in-part of application No. 29/099,171, filed on Jan. 14, 1999, which is a continuation-in-part of application No. 29/066,939, filed on Feb. 19, 1997, now Pat. No. Des. 407,386.

(51) Int. Cl.[7] .................................................. G06F 1/16
(52) U.S. Cl. ...................... 361/683; 361/759; 381/87; 248/551
(58) Field of Search ........................... 361/683, 724–727, 361/87, 88, 309, 740, 759; 248/551–553; 312/216, 218; 70/57–58, 85; 292/42, 148, 151

(56) References Cited

U.S. PATENT DOCUMENTS

| | | | |
|---|---|---|---|
| D. 114,258 | 4/1939 | Becker et al. | |
| D. 321,866 | 11/1991 | Newhouse | D14/106 |
| D. 343,167 | 1/1994 | Mizusugi et al. | D14/106 |
| 5,841,630 | * 11/1998 | Seto et al. | 361/683 |
| 5,870,282 | 2/1999 | Andre et al. | 361/683 |
| 5,880,928 | * 3/1999 | Ma | 361/683 |
| 5,949,565 | * 9/1999 | Ishida | 361/683 |
| 6,082,683 | * 7/2000 | Yates | 248/118.1 |
| 6,101,086 | * 8/2000 | Kim et al. | 361/683 |

OTHER PUBLICATIONS

"Back To The Future At Apple", *Business Week*, May 25, 1998, 1 page.
"Databus, Portable PC Outlook", International Data Corp, Mar. 9, 1998, 1 page.
"Focus—Apple unveils consumer portable computer", Yahoo! Finance, Jul. 21, 1999, pp 1–2.
"A Formula One race car . . . ", Dec. 7, 1998, 1 page.
Wildstrom, Stephen, "More Punch in Apple Portables", Technology & You, *Business Week*, Aug. 16, 1999, p. 12.
Poletti, Therese, "Apple Computer Sues eMachines Over PC Design", Yahoo! News, Aug. 20, 1999, pp1–2.
Spooner, John, "Big Blue unveiling colorful ThinkPad", Yahoo! News, Oct. 1, 1999, pp 1–2.

* cited by examiner

*Primary Examiner*—Leo P. Picard
*Assistant Examiner*—Hung Van Duong
(74) *Attorney, Agent, or Firm*—Duane Morris & Heckscher LLP

(57) ABSTRACT

Portable computing devices, such as notebook and palm top computers are provided which include top and bottom housing portions connected by a hinge in which a set of keys is disposed in the bottom portion and a display screen is disposed in the upper portion. These devices further include a leather grain layer disposed on an exterior facing side of the top portion.

20 Claims, 2 Drawing Sheets

PORTABLE COMPUTING DEVICE WITH LEATHER GRAIN TOP

RELATED APPLICATION DATA

This application is a continuation-in-part of U.S. Design patent application Ser. No. 29/099,171, filed on Jan. 14, 1999, which in turn, is a continuation-in-part of U.S. Design patent application Ser. No. 29/066,939, filed on Feb. 19, 1997, now U.S. Design Pat. No. D407,386, issued on Mar. 30, 1999, which applications and patent are hereby incorporated by reference in their entirety.

BACKGROUND OF THE INVENTION

Portable personal computer shipments were expected to rise to about 18 million units in 1998. Recent market research has indicated that as the price of portable computing falls, and more and more competitors provide like features, it is getting harder and harder for manufacturers to differentiate their products in the marketplace. Most portable computing devices use a beige or charcoal colored housings. Such colors provide little or no market distinction, which has forced manufacturers to look to translucent bright colors, such as Apple Computer, Inc.'s iMac™ and iBook™, or metallic finishes, such as Packard Bell's Z1™. Such computers have been well received, but they are not very appropriate for business use.

Accordingly, there is a need for a portable computing device having an attractive or unique appearance for distinguishing itself in the marketplace, and providing the look and feel of leather.

SUMMARY OF THE INVENTION

Portable computing devices are provided by this invention which include a housing having top and bottom portions connected by a hinge. The top and bottom housing portions include an inwardly facing surface, an outwardly facing surface and a peripheral edge. A set of keys are disposed on an inwardly facing surface of the bottom portion of the housing, and a display screen is disposed on an inwardly facing surface of the top portion of the housing. The portable computing devices, include the improvement of a leather grain layer disposed on an exterior facing surface of at least the top portion of the housing.

The use of synthetic or natural leather on portable computing devices adds a luxurious and expensive looking aesthetic appearance to such devices. The leather grain layer can be disposed on a major portion of the outwardly facing surface of the top portion to provide an eye catching, upscale appearance that is perfect for the business environment. The high friction surface and texture of the leather is also easier for fingers to grip and hold.

BRIEF DESCRIPTION OF THE DRAWINGS

The accompanying drawings illustrate preferred embodiments of the invention as well as other information pertinent to the disclosure, in which.

DETAILED DESCRIPTION OF THE INVENTION

Figure 1:
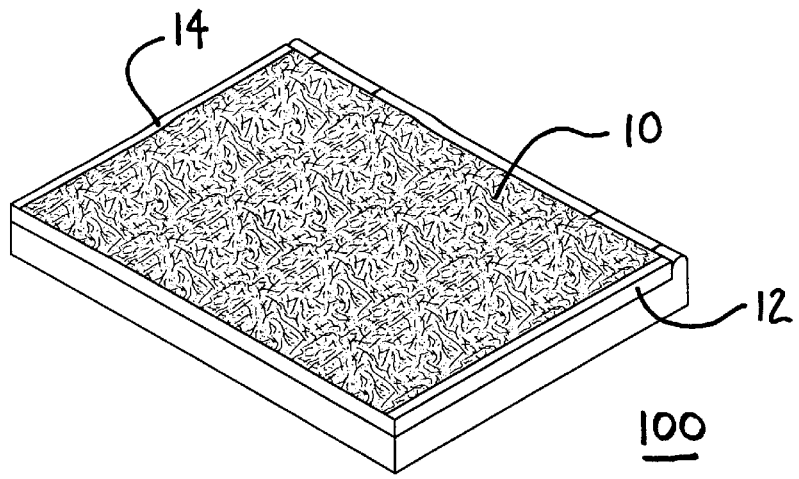
FIG. 1: is a front perspective view of a portable notebook computing device having a leather grain layer.
Figure 2:
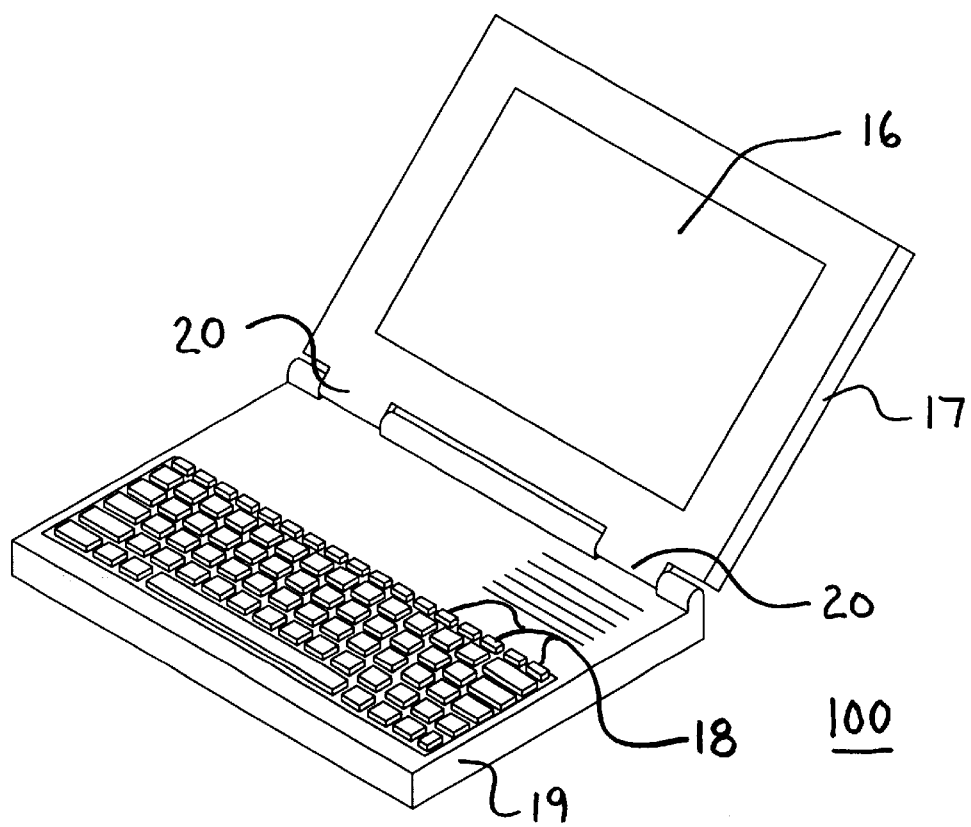
FIG. 2: is the portable notebook computing device of FIG. 1 in an open condition.

With respect to the drawings, and in particular, to the notebook computer 100 shown FIGS. 1 and 2, a description of one preferred embodiment of this invention follows. The notebook computer 100 is of a typical design, including a housing having a top portion 17 and a bottom portion 19 connected by hinge 20. Hinge 20 has at least one hinge element, but is illustrated in FIG. 1 as having two of such elements. The top and bottom portions, also called shells because of the shallow cavities they contain, have inwardly facing surfaces and outwardly facing surfaces, and a peripheral edge. A set of keys 18 is disposed on the inwardly facing surface of the bottom housing portion 19 and a display screen 16 is disposed on an inwardly facing surface of the top housing portion 17. In an important aspect of this invention, a leather grain layer 10 is disposed on the exterior facing surface of the top portion of the housing 17. In the embodiment shown in FIG. 1, a pair of lateral edges 12 and 14 are provided which can be non-ornamental or smooth in appearance. This is optional, since the top can contain a partial or a full leather grain, and the shell can be provided in a variety of shapes and sizes, with curved or square edges and/or corners.

It will be apparent to one of ordinary skill in the art that the leather grain layer 10 of this invention can be a natural leather or a synthetic leather material, such as embossed vinyl. The leather grain ideally exhibits a random grain pattern such as that exhibited by natural leather. It is envisioned that one of ordinary skill in the art will be able to use leather and leather-like materials of known sources, with the ability to bind these materials to the upper housing portion 117 in a conventional manner, such as by adhesive, heat sealing or ultrasonic welding, for example.

Figure 3:
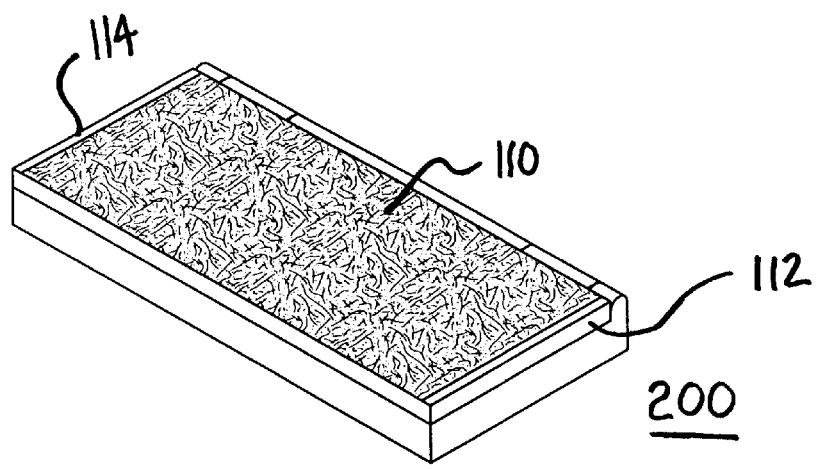
FIG. 3: is a hand-held portable computing device also having a leather grain top layer.
Figure 4:
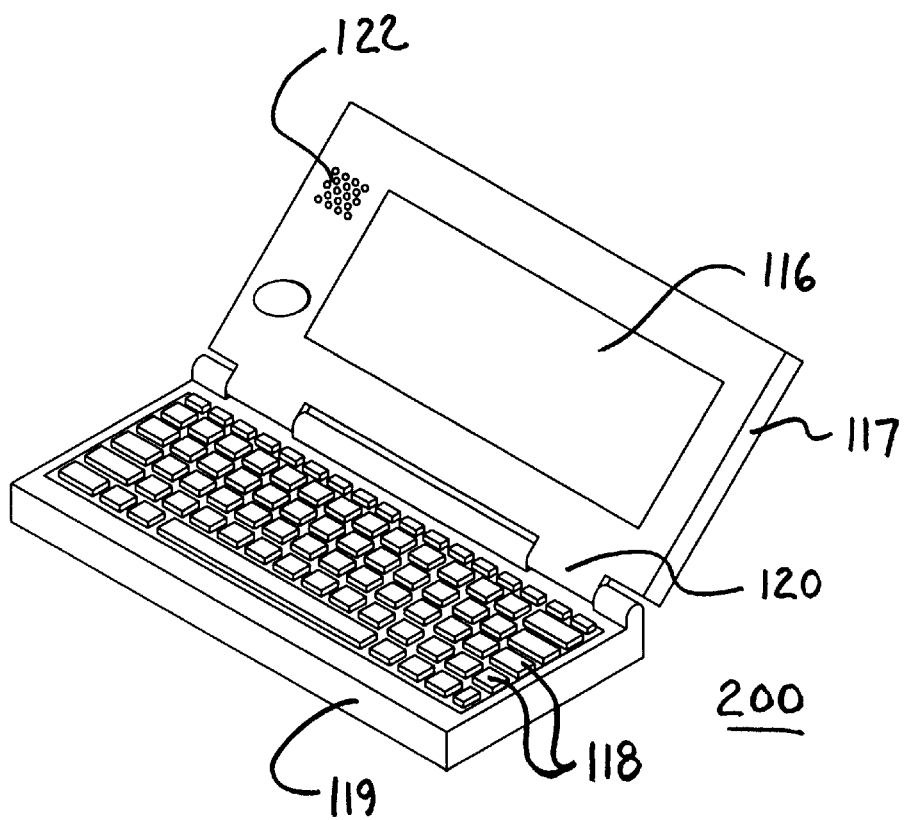
FIG. 4: is the hand-held computing device of FIG. 3 in an open condition.

The portable computing device of this invention may be embodied by a hand-held or "palmtop" computing device 200 as shown in FIGS. 3 and 4. Such devices are known to have a great deal of computing power, but generally have a smaller keyboard 118 and display screen 116 located in the lower housing portion 119 and upper housing portion 117, respectively. Hand-held devices also may include, for example, a series of apertures 122 in the housing for a speaker or microphone, for example.

As with the previous notebook embodiment 100, the hand-held computing device 200 can include a pair of optional smooth lateral edges 112 and 114. Such lateral edges can be helpful in protecting the edge of the leather grain layer from being damaged or delaminated due to heavy use or contact with hard surfaces.

From the foregoing, it can be realized that this invention provides portable computing devices having a leather grain top for providing a distinctive appearance, better tactile feel and gripping capability, a more luxurious feel and better marketing distinction. Although various embodiments have been illustrated, this was for the purpose of describing, but not limiting the invention. Various modifications which will become apparent to one skilled in the art, are within the scope of this invention described in the attached claims.

What is claimed:

1. A portable computing device comprising:
   a housing having top and bottom portions connected by a hinge, said top and bottom housing portions having an inwardly facing surface, an outwardly facing surface and a peripheral edge said outwardly facing surface having a central planar surface bordered by a pair of raised lateral side edges said outwardly facing surface having a central planer surface bordered by a pair of raised lateral side edges;

a set of keys disposed on an inwardly facing surface of said bottom portion;

a display screen disposed on an inwardly facing surface of said top portion; and a leather grain layer disposed between said pair of raised lateral side edges on said central planer surface.

2. The portable computing device of claim 1, wherein said leather grain layer is disposed on a major portion of said outwardly facing surface of said top portion of said housing.

3. The portable computing device of claim 1, wherein said leather grain layer comprises a random grain pattern.

4. The portable computing device of claim 1, wherein said outwardly facing surface of said top portion of said housing comprises at least one of said pair of lateral side edges has a surface area less than the surface area of said leather grain layer.

5. The portable computing device of claim 1, wherein said leather grain layer is located at least on a substantial portion of said outwardly facing surface of said top portion of said housing.

6. The portable computing device of claim 1, wherein said leather grain layer comprises natural or synthetic leather.

7. The portable computing device of claim 4, wherein said at least one of said pair of lateral side edges is smoother in texture than said leather grain layers.

8. A portable computing device comprising:

a housing having top and bottom shell portions hingedly connected along a rear edge of said shell portions, each of said shell portions having an outwardly facing surface and an inwardly facing surface, said inwardly facing surfaces facing one another when said top and bottom shell portions are swivelled along said hinge into a closed position, said top shell portion having disposed thereon a pair of raised side edge portions;

a set of keys located on said inwardly facing surface of said bottom shell portion;

a display screen located on said inwardly facing surface of said top shell portion; and a leather grain layer disposed between said pair of raised side edge portions on an outwardly facing surface of said top shell portion.

9. The portable computing device of claim 8 wherein said leather grain layer comprises natural leather.

10. The portable computing device of claim 8 wherein said side edge portions do not exhibit a leather grain.

11. A portable computing device comprising:

a housing having top and bottom shell portions hingedly connected proximate to a rear edge region of said shell portions, each of said shell portions having an outwardly facing surface and an inwardly facing surface, said inwardly facing surfaces facing one another when the top and bottom shell portions are swiveled along said hinge into a closed position;

a set of keys located on an inwardly facing surface of said bottom shell portion;

a display screen located on an inwardly facing surface of said top shell portion; and a leather grain layer disposed on an outwardly facing surface of said top shell portion; said top shell portion comprising a pair of raised lateral side edge portions bordering said leather grain layer on opposing sides of said top shell portion, said raised lateral side edge portions configured to help in protecting an edge of the leather grain layer from being damaged or delaminated due to heavy use or contact with hard surfaces.

12. The portable computing device of claim 11 wherein said leather grain layer is disposed directly onto said outwardly facing surface of said top shell portion, without any intermediate structural layers.

13. The portable computing device of claim 11 wherein said portable computing device comprises a hand-held or palmtop computing device.

14. The portable computing device of claim 11 wherein said raised lateral side edge portions comprise a smooth surface.

15. The portable computing device of claim 11 wherein said raised lateral side edge portions comprise a top surface which is at least substantially coplanar with said leather grain layer and a side surface which is coextensive with the lateral sides of said outwardly facing surface of said top shell portion.

16. The portable computing device of claim 11 wherein said leather grain layer comprises natural or synthetic leather.

17. The portable computing device of claim 11 wherein said leather grain layer provides a better tactile feel for greater gripping capability.

18. The portable computing device of claim 12 wherein said leather grain layer is applied to said outwardly facing surface of said top shell portion by adhesive, heat sealing or ultrasonic welding.

19. The portable computing device of claim 13 wherein said hand-held or palmtop computing device comprises a speaker or microphone.

20. The portable computing device of claim 13 wherein said top shell portion comprises a curved edge or corner.

* * * * *

UNITED STATES PATENT AND TRADEMARK OFFICE
CERTIFICATE OF CORRECTION

PATENT NO. : 6,327,142 B1
DATED : December 4, 2001
INVENTOR(S) : Peter J. Cronk

Page 1 of 1

It is certified that error appears in the above-identified patent and that said Letters Patent is hereby corrected as shown below:

<u>Column 2, claim 1,</u>
Lines 65-67, please delete the first occurrence of "said outwardly facing surface having a central planar surface bordered by a pair of raised lateral side edges".

Signed and Sealed this

Ninth Day of April, 2002

Attest:

JAMES E. ROGAN
*Attesting Officer*  *Director of the United States Patent and Trademark Office*

(12) EX PARTE REEXAMINATION CERTIFICATE (7994th)
United States Patent
Cronk

(10) Number: US 6,327,142 C1
(45) Certificate Issued: Jan. 18, 2011

(54) PORTABLE COMPUTING DEVICE WITH LEATHER GRAIN TOP

(75) Inventor: Peter J. Cronk, Moorestown, NJ (US)

(73) Assignee: Spanish Leather LLC, Palm Beach Gardens, FL (US)

Reexamination Request:
No. 90/009,540, Sep. 17, 2009

Reexamination Certificate for:
Patent No.: 6,327,142
Issued: Dec. 4, 2001
Appl. No.: 09/360,678
Filed: Jul. 26, 1999

Certificate of Correction issued Apr. 9, 2002.

Related U.S. Application Data

(63) Continuation-in-part of application No. 29/099,171, filed on Jan. 14, 1999, now Pat. No. Des. 430,155, which is a continuation-in-part of application No. 29/066,939, filed on Feb. 19, 1997, now Pat. No. Des. 407,386.

(51) Int. Cl.
*G06F 1/16* (2006.01)

(52) U.S. Cl. ............ 361/679.27; 248/551; 361/679.56; 361/759; 381/87

(58) Field of Classification Search .................. 361/683
See application file for complete search history.

(56) References Cited

U.S. PATENT DOCUMENTS

| | | |
|---|---|---|
| 1,613,365 A | 1/1927 | Underwood |
| 2,017,445 A | 10/1935 | Peterson |
| 2,461,421 A | 2/1949 | Jacobus |
| 2,479,854 A | 8/1949 | Miller |
| 2,508,128 A | 5/1950 | Waards |
| 3,847,656 A | 11/1974 | Baumann et al. |
| 3,890,186 A | 6/1975 | Blaschke et al. |
| 4,264,962 A | 4/1981 | Kodaira |
| 4,292,481 A | 9/1981 | Barnes et al. |
| D284,966 S | 8/1986 | Larkins |
| 5,002,184 A | 3/1991 | Lloyd |
| 5,105,338 A | 4/1992 | Held |
| 5,407,517 A | 4/1995 | Hansel et al. |
| 5,413,814 A | 5/1995 | Bowen et al. |
| 6,109,434 A | 8/2000 | Howard, Jr. |
| 6,421,235 B2 | 7/2002 | Ditzik |
| 6,426,870 B1 | 7/2002 | Oross et al. |
| 2006/0060292 A1 | 3/2006 | Song et al. |
| 2006/0068160 A1 | 3/2006 | Song et al. |
| 2006/0093837 A1 | 5/2006 | Song et al. |

FOREIGN PATENT DOCUMENTS

| | | |
|---|---|---|
| JP | 06274456 | 9/1994 |
| JP | 10234448 | 9/1998 |

OTHER PUBLICATIONS

Tomei Collection, Kodak No. 1A Folding Pocket 1899–1905.
http://Idtomei.googlepages.com/kodakno.1afoldingpocket-1899–1905.
The Classic Camera Repair Forum, Voigtlander Virtus Leather Restoration, Feb. 20, 2008–Feb. 25, 2008.
http://www.kyphoto.com/classics/forum/message/3/11626.html?1203967275.
Wikipedia, Ultrasonic welding, Jun. 2, 2010, pp. 1–6.
ABOUT.COM, Composites/Plastics, Heat Sealing, Jun. 2, 2010, 1 pg.

*Primary Examiner*—James Menefee

(57) ABSTRACT

Portable computing devices, such as notebook and palm top computers are provided which include top and bottom housing portions connected by a hinge in which a set of keys is disposed in the bottom portion and a display screen is disposed in the upper portion. These devices further include a leather grain layer disposed on an exterior facing side of the top portion.

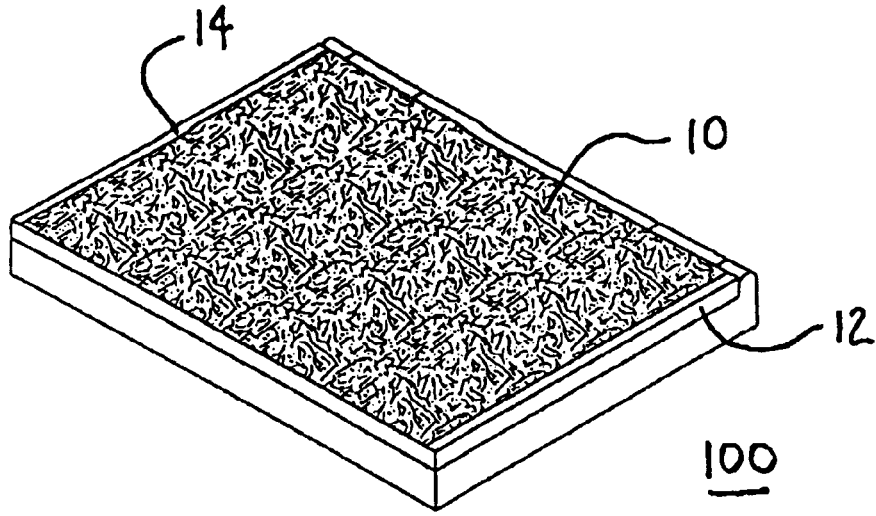

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 4, 7 and 15 are cancelled.

Claims 1, 8 and 11 are determined to be patentable as amended.

Claims 2-3, 5-6, 9-10, 12-14 and 16-20, dependent on an amended claim, are determined to be patentable.

1. A portable computing device comprising:
a housing having top and bottom portions connected by a hinge, said top and bottom housing portions having an inwardly facing surface, an outwardly facing surface and a peripheral edge said outwardly facing surface having a central planar surface bordered by a pair of raised lateral side edges[said outwardly facing surface having a central planer surface bordered by a pair of raised lateral side edges];
a set of keys disposed on an inwardly facing surface of said bottom portion;
a display screen disposed on an inwardly facing surface of said top portion; and
a leather grain layer disposed between said pair of raised lateral side edges on said central planer surface *wherein said outwardly facing surface of said top portion of said housing comprises at least one of said pair of lateral side edges and has a surface area less than the surface area of said leather grain layer; and said at least one of said pair of lateral side edges is smoother in texture than said leather grain leather.*

8. A portable computing device comprising:
a housing having top and bottom shell portions hingedly connected along a rear edge of said shell portions, each of said shell portions having an outwardly facing surface and an inwardly facing surface, said inwardly facing surfaces facing one another when said top and bottom shell portions are swivelled along said hinge into a closed position, said top shell portion having disposed thereon a pair of raised side edge portions;
a set of keys located on said inwarldy facing surface of said bottom shell portion;
a display screen located on said inwardly facing surface of said top shell portion; and
a leather grain layer disposed between said pair of raised side edge portions on an outwardly facing surface of said top shell portion; *wherein said raised lateral side edge portions comprise a top surface which does not rise substantially above a central planar portion of said leather grain layer and a side surface which is coextensive with the lateral sides of said outwardly facing surface of said shell top portion.*

11. A portable computing device comprising:
a housing having top and bottom shell portions hingedly connected proximate to a rear edge region of said shell portions, each of said shell portions having an outwardly facing surface and an inwardly facing surface, said inwardly facing surfaces facing one another when the top and bottom shell portions are swiveled along said hinge into a closed position;
a set of keys located on an inwardly facing surface of said bottom shell portion;
a display screen located on an inwardly facing surface of said top shell portion; and
a leather grain layer disposed on an outwardly facing surface of said top shell portion; said top shell portion comprising a pair of raised lateral side edge portions bordering said leather grain layer on opposing sides of said top shell portion, said raised lateral side edge portions configured to help in protecting an edge of the leather grain layer from being damaged or delaminated due to heavy use or contact with hard surface; *wherein said raised lateral side edge portions comprise a top surface which is at least substantially coplanar with said leather grain layer and a side surface which is coextensive with the lateral sides of said outwardly facing surface of said top shell portion.*

\* \* \* \* \*